US010754784B1

(12) United States Patent
Jakkula et al.

(10) Patent No.: US 10,754,784 B1
(45) Date of Patent: Aug. 25, 2020

(54) MECHANISM FOR A CACHE TO SELF-TUNE EFFICIENTLY TO ALLOW SCALING WITH THE SIZE OF WORKING SET

(71) Applicant: STELLUS TECHNOLOGIES, INC., San Jose, CA (US)

(72) Inventors: Vijaya Jakkula, San Jose, CA (US); Siva Ramineni, Milpitas, CA (US); Venkata Bhanu P. Gollapudi, Pleasanton, CA (US)

(73) Assignee: Stellus Technologies, Inc., San Jose, CA (US)

( * ) Notice: Subject to any disclaimer, the term of this patent is extended or adjusted under 35 U.S.C. 154(b) by 0 days.

(21) Appl. No.: 16/435,238

(22) Filed: Jun. 7, 2019

(51) Int. Cl.
*G06F 12/08* (2016.01)
*G06F 12/0891* (2016.01)
*G06F 16/907* (2019.01)
*G06F 9/50* (2006.01)
*G06F 12/0815* (2016.01)

(52) U.S. Cl.
CPC ........ *G06F 12/0891* (2013.01); *G06F 9/5016* (2013.01); *G06F 12/0815* (2013.01); *G06F 16/907* (2019.01)

(58) Field of Classification Search
None
See application file for complete search history.

(56) References Cited

U.S. PATENT DOCUMENTS

| 8,433,735 | B2 | 4/2013 | Lacapra |
| 9,678,879 | B2 | 6/2017 | Whitehouse |
| 9,823,856 | B1 | 11/2017 | Tripathi |
| 10,169,246 | B2 | 1/2019 | Senior et al. |

FOREIGN PATENT DOCUMENTS

CN 103279568 A 9/2013

*Primary Examiner* — Kevin Verbrugge
(74) *Attorney, Agent, or Firm* — Lewis Roca Rothgerber Christie LLP

(57) ABSTRACT

Provided is a method of cache entry management, the method comprising determining, by a cache manager, a level of importance for each of a plurality of cache entries, assigning, by the cache manager, a metadata type for each of the cache entries based upon the determined level of importance, determining, by the cache manager, a frequency of access of each of the cache entries, generating, by the cache manager, a heat map based upon the determined frequency of access of the cache entries, and determining, by the cache manager, which one of at least two of the cache entries to evict based upon the respective metadata types and the respective frequencies of access.

20 Claims, 3 Drawing Sheets

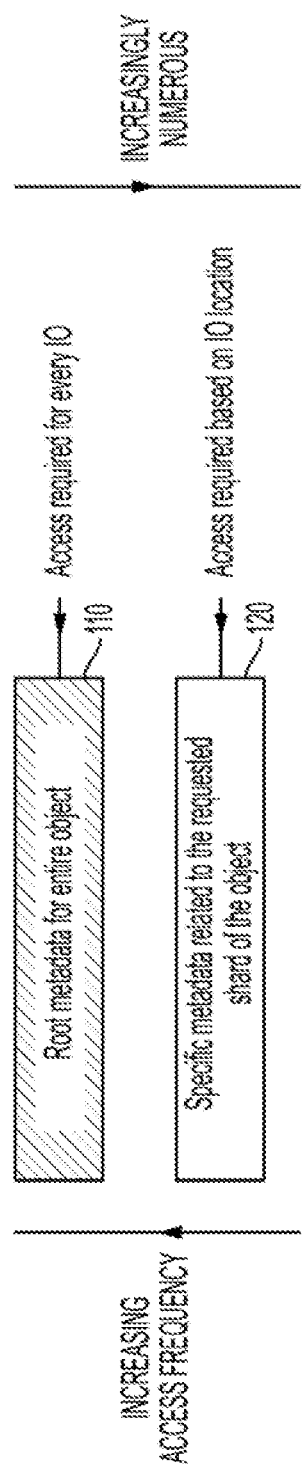

MECHANISM FOR A CACHE TO SELF-TUNE EFFICIENTLY TO ALLOW SCALING WITH THE SIZE OF WORKING SET

FIELD

One or more aspects of embodiments of the present disclosure relate generally to methods of cache entry management, and a distributed object store configured to perform the methods.

BACKGROUND

To enable operation, a "distributed object store" that comprises a network of memory drives generally uses sophisticated metadata to manage different aspects of stored object data. A few of the aspects managed by the metadata may include growth or shrinkage of an object, data location, data management policies corresponding to the object (e.g., whether duplicate copies are warranted), object-versioning corresponding to the immutable nature of object store, tracking of a location of the object data on the data store given an object ID, etc. Further, objects may have to be moved around within the object store (e.g., in the event of a partial failure in the distributed system).

A distributed object store will typically store multiple metadata objects corresponding to the same data object to help manage the different aspects of the data object. Further, a distributed object store may employ caching of metadata to stay performant as the size of the object store scales, as performance may be improved by simply caching frequently accessed metadata due to the fact that accessing the cache is generally significantly faster than accessing the media where the object resides.

However, when scaling, effectiveness of the cache decreases as the working set (e.g., number and size of data objects and metadata objects) increases. That is, a cache may become less effective as "hot" (e.g., frequently accessed) items repeatedly evict one another, thereby resulting in a phenomenon known as "cache thrashing." Cache thrashing may affect performance of the I/O path as the working set increases, and therefore may be a more significant problem for large scale distributed object stores.

SUMMARY

Embodiments described herein provide improvements to cache entry management by determining which cache entries to mark for eviction based on multiple factors.

According to one embodiment of the present disclosure, there is provided a method of cache entry management, the method including determining, by a cache manager, a level of importance for each of a plurality of cache entries, assigning, by the cache manager, a metadata type for each of the cache entries based upon the determined level of importance, determining, by the cache manager, a frequency of access of each of the cache entries, generating, by the cache manager, a heat map based upon the determined frequency of access of the cache entries, and determining, by the cache manager, which one of at least two of the cache entries to evict based upon the respective metadata types and the respective frequencies of access.

The method may further include causing, by the cache manager, portions of the heat map corresponding to cache entries having a lower level of importance to decay faster than other portions of the heat map corresponding to cache entries having a higher level of importance.

The method may further include evicting, by the cache manager, one of the cache entries once a portion of the heat map corresponding to the one of the cache entries reaches zero.

The method may further include causing, by the cache manager, a portion of a heat map corresponding to a shard of an object to decay faster than a portion of the heat map corresponding to an entirety of the object.

The method may further include walking, by the cache manager, the cache, and evicting, by the cache manager, all of the cache entries corresponding to a level of importance that is less than a reference level of importance.

The method may further include triggering, by the cache manager, the walking of the cache once an amount of cache resources that are used reaches a reference level.

The method may further include assigning, by the cache manager, a highest level of importance to root metadata representing an entirety of an object, and assigning, by the cache manager, a lower level of importance to other metadata related to the object for shard metadata representing a shard of the object.

According to another embodiment of the present disclosure, there is provided an object store configured to allow cache management while scaling with the size of a working set, the object store including a data cache that is configured to be managed by a cache manager, wherein the cache manager is configured to determine a level of importance for each of a plurality of cache entries, assign a metadata type for each of the cache entries based upon the determined level of importance, determine a frequency of access of each of the cache entries, generate a heat map based upon the determined frequency of access of the cache entries, and determine which one of at least two of the cache entries to evict based upon the respective metadata types and the respective frequencies of access.

The cache manager may be further configured to cause portions of the heat map corresponding to cache entries having a lower level of importance to decay faster than other portions of the heat map corresponding to cache entries having a higher level of importance.

The cache manager may be further configured to evict one of the cache entries once a portion of the heat map corresponding to the one of the cache entries reaches zero.

The cache manager may be further configured to cause a portion of a heat map corresponding to a shard of an object to decay faster than a portion of the heat map corresponding to an entirety of the object.

The cache manager may be further configured to walk the data cache, and evict all of the cache entries corresponding to a level of importance that is less than a reference level of importance.

The cache manager may be further configured to trigger the cache manager to walk the data cache once an amount of cache resources that are used reaches a reference level.

The cache manager may be further configured to assign a highest level of importance to root metadata representing an entirety of an object, and assign a lower level of importance to other metadata related to the object for shard metadata representing a shard of the object.

According to yet another embodiment of the present disclosure, there is provided a non-transitory computer readable medium implemented on a display codec for a display device, the non-transitory computer readable medium implemented on a distributed object store system, the non-transitory computer readable medium having computer code that, when executed on a processor, implements a method of cache management by a cache manager of a data cache of the distributed object store system, the method including determining, by the cache manager, a level of importance for each of a plurality of cache entries, assigning, by the cache manager, a metadata type for each of the cache entries based upon the determined level of importance, determining, by the cache manager, a frequency of access of each of the cache entries, generating, by the cache manager, a heat map based upon the determined frequency of access of the cache entries, and determining, by the cache manager, which one of at least two of the cache entries to evict based upon the respective metadata types and the respective frequencies of access.

The computer code, when executed by the processor, may further implement the method of cache management of the data cache of the distributed object store system by causing, by the cache manager, portions of the heat map corresponding to cache entries having a lower level of importance to decay faster than other portions of the heat map corresponding to cache entries having a higher level of importance.

The computer code, when executed by the processor, may further implement the method of cache management of the data cache of the distributed object store system by evicting, by the cache manager, one of the cache entries once a portion of the heat map corresponding to the one of the cache entries reaches zero.

The computer code, when executed by the processor, may further implement the method of cache management of the data cache of the distributed object store system by causing, by the cache manager, a portion of a heat map corresponding to a shard of an object to decay faster than a portion of the heat map corresponding to an entirety of the object.

The computer code, when executed by the processor, may further implement the method of cache management of the data cache of the distributed object store system by walking, by the cache manager, the data cache, and evicting, by the cache manager, all of the cache entries corresponding to a level of importance that is less than a reference level of importance.

The computer code, when executed by the processor, may further implement the method of cache management of the data cache of the distributed object store system by triggering, by the cache manager, walking of the data cache once an amount of cache resources that are used reaches a reference level.

Accordingly, the self-tuning cache of embodiments of the present disclosure allows storage systems to scale in performance as the size of the storage system increases.

BRIEF DESCRIPTION OF THE DRAWINGS

The abovementioned and/or other aspects will become apparent and more readily appreciated from the following description of the embodiments, taken in conjunction with the accompanying drawings, in which:

FIG. 1 is a block diagram depicting the generic nature of metadata of an object store, according to one or more embodiments of the present disclosure;

DETAILED DESCRIPTION

Figure 2A:
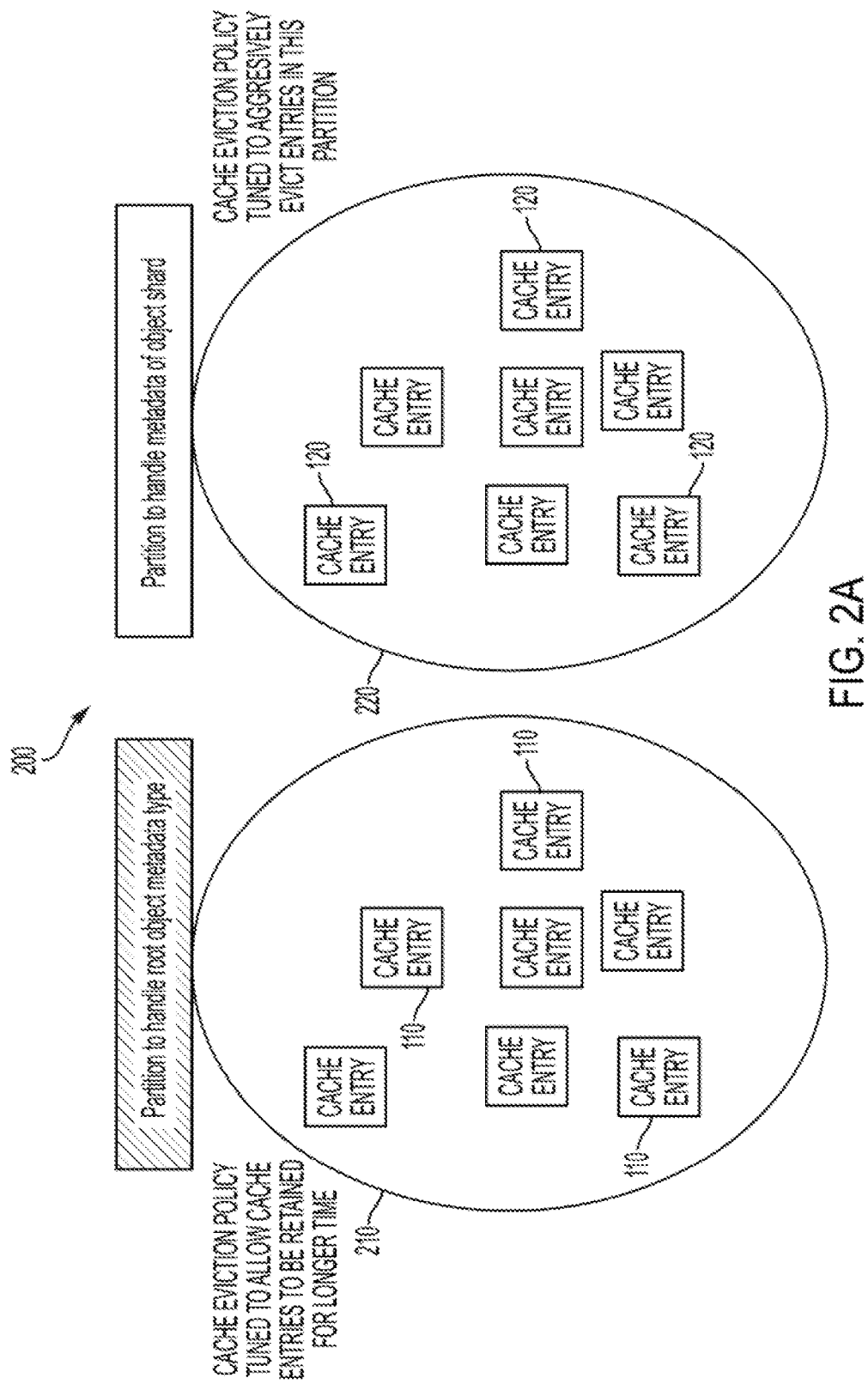
FIG. 2A is a block diagram depicting two different partitions of a cache for caching respective cache entries, according to one or more embodiments of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

As described above, cache thrashing, which results from hot data items repeatedly evicting one another, negatively affects the performance of the cache as the working set increases.

Conventionally, performance of a scalable distributed object store depends upon how performant the object store is in accessing metadata corresponding to an object. Effectively accessing metadata has conventionally required caching frequently accessed metadata for an object such that the metadata can be accessed relatively quickly. However a cache used for caching the more frequently accessed metadata in the scalable object store has conventionally faced challenges.

For example, a scalable distributed object store may desirably scale for billions of objects, and may also desirably allow thousands of concurrent clients using different applications, each of the various clients potentially accessing different data sets for the different respective workloads of the clients. However, scalability needs corresponding to access requirements may make a cache less effective due to the large working set that is generated from the concurrent accesses having different requirements.

Further, simply increasing the size of the cache only partially alleviates the problem due to the large number of objects that may be accessed, and due to each of the objects potentially having multiple associated metadata objects that may be cached. For example, an I/O may be unable to successfully perform a lookup operation to find metadata in the cache, and would therefore have to access memory storage to find the metadata, due to the large size of the cache.

Accordingly, although traditional caching may help address performance of an I/O path of the object store, as the object store scales, the benefit achieved from caching the more frequently accessed metadata may be outweighed due to "cache thrashing," which may occur as concurrent accesses compete with each other for cache resources. Embodiments of the present disclosure address this challenge by reducing the unwanted effects of cache thrashing.

Embodiments of the present disclosure provide a self-learning and self-tuning cache, which is able to make intelligent choices about deciding when to cache metadata, which metadata to cache, which metadata to evict, and how long metadata that is already cached should be retained.

Embodiments of the present disclosure also provide a cache that is aware of a type of a cache entry, and that able to judge a level of importance based on the type of the cache entry.

Accordingly, by assigning different importance values to respective cache entries, the cache is able to bias toward, or to give preference to, high value cache entries that are assigned a high level of importance as the working set increases.

FIG. 1 is a block diagram depicting the generic nature of metadata of an object store, according to one or more embodiments of the present disclosure.

Referring to FIG. 1, various types of metadata may be stored as metadata objects in the cache of a distributed object store. One type of metadata is root metadata 110, which may represent an entire data object. The root metadata 110 will generally be accessed by any I/O thread that is seeking to access some aspect of the object. For example, even if an I/O thread seeks to only access a shard of the object, the I/O thread will still access the root metadata 110.

Contrastingly, other specific metadata (e.g., shard metadata) 120 is specifically related only to a requested shard of the object whose entirety is represented by the root metadata 110. That is, if an I/O thread does not seek to access the data object in its entirety, but instead only seeks to access a shard of the object, the I/O thread may access corresponding shard metadata 120 to retrieve information corresponding only to the sought after shard of the object. Accordingly, the shard metadata 120 represents individual shards of the object, and may be used to respectively manage attributes specific to the corresponding object shard.

An I/O thread's access to an object makes use of access to the root metadata 110 corresponding to the object as a whole, followed by access to shard metadata 120 associated with an object shard that depends upon the location and nature of the I/O access being requested. Accordingly, metadata objects corresponding to shard metadata 120 will typically be relatively numerous, as there will generally be many respective aspects corresponding to a single data object that are managed by the shard metadata 120. Contrastingly, only one instance of root metadata 110 is used to manage the data object as a whole.

However, each individual instance of shard metadata 120 is generally accessed much less frequently than the root metadata 110, as various I/O threads interested in some aspect of the data object will generally be unconcerned with some number of the individual shards of the object. That is, because all I/O threads that perform a lookup operation with respect to a data object will generally access the root metadata 110, the more numerous instances of shard metadata 120 will be individually accessed less frequently than the root metadata 110.

Embodiments of the present disclosure leverage the innate nature of metadata of the objects for self-tuning the cache to ensure that the cache remains effective even as the working set scales with increasing client connections and concurrent accesses. To achieve this, the cache may use a cache manager to leverage the type of metadata to self-tune. That is, embodiments of the present disclosure may achieve effective caching in a large scale distributed object store by leveraging inherent metadata characteristics resulting from aspects of an object FIG. 2A is a block diagram depicting two different partitions of a cache for caching respective cache entries, according to one or more embodiments of the present disclosure, and FIG. 2B is a block diagram depicting the two different partitions of the cache of FIG. 2A following the eviction of some of the cache entries from one of the partitions, according to one or more embodiments of the present disclosure.

Figure 2B:
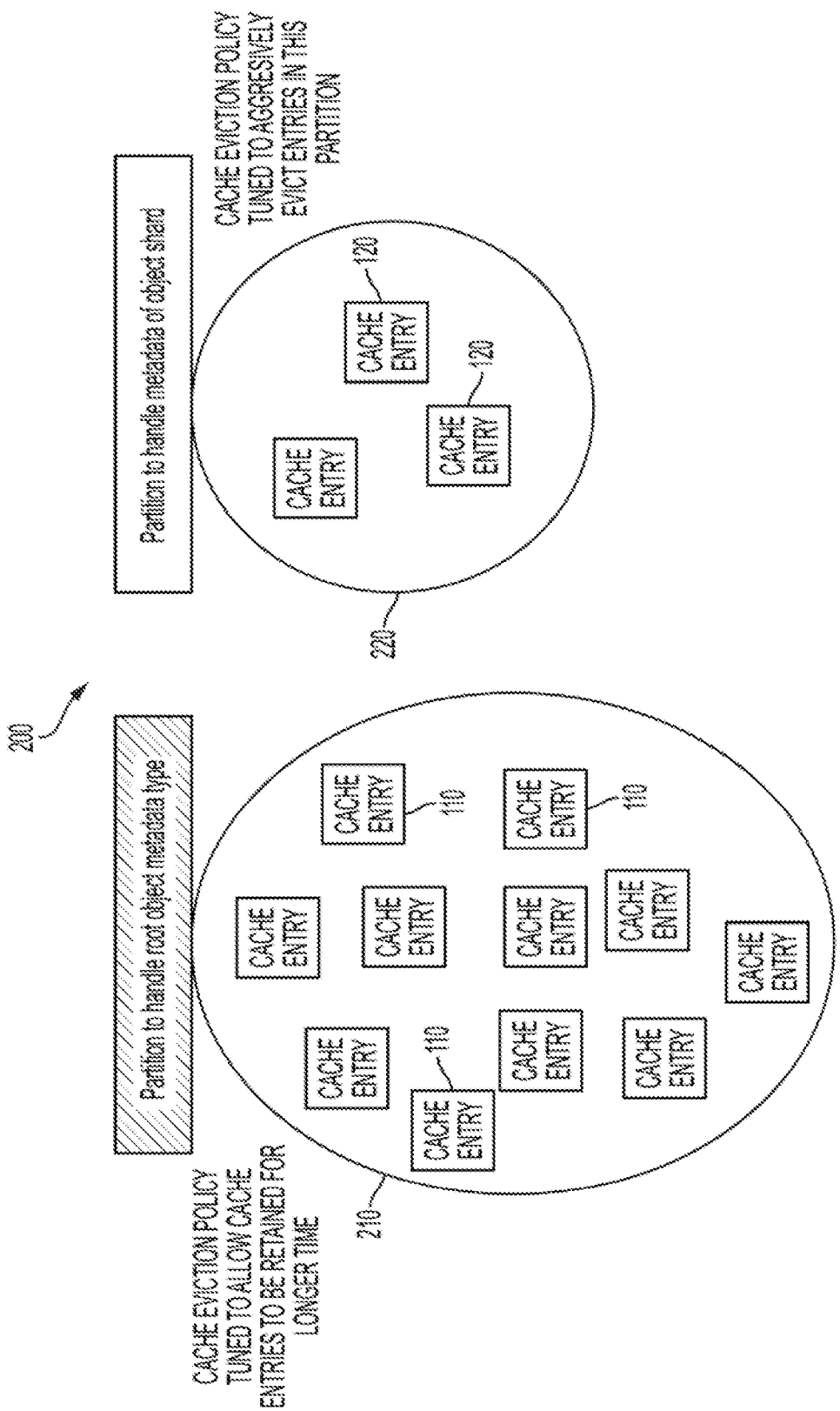
FIG. 2B is a block diagram depicting the two different partitions of the cache of FIG. 2A following the eviction of some of the cache entries from one of the partitions, according to one or more embodiments of the present disclosure.

Referring to FIG. 2A, a cache 200 is partitioned based on a metadata type corresponding to the metadata of cache entries to be stored therein. It should be noted that that the two partitions illustrated in FIGS. 2A and 2B are merely an example for illustrating aspects of the present disclosure. In other embodiments, there can numerous such partitions (i.e., more than two). In implementations of the present disclosure, there may be several partitions for employing aspects of the disclosed embodiments to enable effective caching. In the present embodiment, the cache 200 includes a root object metadata partition 210 to handle cache entries that are assigned a metadata type corresponding to root metadata 110, and an object shard metadata partition 220 to handle cache entries that are assigned a metadata type corresponding to shard metadata 120 that corresponds to only a shard of an object.

The access pattern for shard metadata 120 corresponding to object shards is such that access is only required when the location of the I/O access falls within a respective shard. Accordingly, as the I/O activity moves along within regard to the object to move from one shard to another shard, the shard metadata 120 for the previous object shard is no longer required by the I/O access. However the access pattern for the root metadata 110 that represents the entire object is different as every I/O access to the object requires access to the root metadata 110 independent of the I/O location in the object. Accordingly, as previously mentioned, root metadata 110 will generally be accessed more frequently than shard metadata 120.

According to the present embodiment, a cache manager assigns one of two different "metadata types" to the cache entries, as an example. However, it should be noted that a larger number of respective types of metadata (e.g., 3 or more) may be used in other embodiments of the present disclosure. Accordingly, in the present example, the cache entries corresponding to root metadata 110 are assigned a first metadata type (e.g., "type 0"), and the cache entries corresponding to shard metadata 120 are assigned a second metadata type (e.g., "type 1").

By assigning different metadata types to different kinds of metadata, a hierarchy is able to be formed. Accordingly, the cache 200 may self-tune to thereby remain effective as the working set increases by allocating additional resources to enable the caching of high value data corresponding to cache entries that are assigned a high level of importance. The mechanism for self-tuning scales with the number of objects in the working set for the object, as computation for self-tuning is based on a constant size input (e.g., based on a type of metadata), and is not based on the size of the working set, which may possibly become very large.

Further, as discussed further below, the eviction policy for each partition 210, 220 may be tuned to the expected hotness that is innate for, or that generally corresponds to, the particular metadata type associated with the partition. These and other eviction operations may be achieved by a dedicated background thread that runs at low priority to ensure the cache remains effective as the working set increases.

Referring to FIG. 2B, as resources of the cache 200 become consumed, the cache 200 may determine that some of the cache entries should be evicted. The cache 200 may then begin to walk the various cache entries so that it may determine which cache entries to evict.

For example, the cache 200 may use a reference level of capacity (e.g., 90% full) to determine when to begin evicting some of the cache entries cached therein. However, it should be noted that different capacity levels and different triggers for eviction may be used in accordance with the embodiments of the present disclosure (e.g., the cache may begin eviction at the direction of an administrator).

Accordingly, the cache 200 may determine which cache entries to evict to free up additional resources based upon the metadata type assigned to the cache entries. For example, the cache 200 may decide to evict each cache entry of a particular metadata type, or of a particular metadata type or "lower" (e.g., of a particular level of importance or less). Also, the cache 200 may decide to evict each cache entry of a particular metadata type until a trigger occurs (e.g., until a given level of capacity of the cache 200, such as 80% full, is reached, or until a given percentage of capacity is evicted, such as 10%).

In the present example, the cache 200 may determine that a cache entry that is assigned a "type 0" metadata type is generally more important than a cached entry that is assigned a "type 1" metadata type. This may be true even if two particular cache entries, which are respectively assigned the "type 0" metadata type and the "type 1" metadata type, are accessed with approximately equal frequency. Thus, the cache 200 may effectively bias itself toward higher value metadata.

Accordingly, as can be seen by comparing FIG. 2A to FIG. 2B, the cache 200 may evict some of the "type 1" cache entries including shard metadata 120 from the object shard metadata partition 220, thereby freeing up resources that may be used to generate additional cache entries including root metadata 110 in the root metadata partition 210.

Furthermore, as mentioned above, an object store including the cache 200 may effectively handle I/O hotspots, irrespective of the metadata type assigned to the cache entries, by caching low value cache entries when appropriate. This may be accomplished by considering additional parameters.

For example, the cache 200 may also employ a heat map for the cache entries to keep track of a frequency of access to the cache entries. This enables embodiments of the present disclosure to learn how to discriminate among different metadata objects of a same metadata type based on how frequently the metadata objects are accessed.

The cache manager may maintain a heat map for each metadata object that is cached. The cache manager may then increment a portion of the heat map for every access to a corresponding metadata object. However a rate of decay of the heat map may be decided based on the metadata type assigned to the metadata.

For example, portions of the heat map corresponding to shard metadata that is assigned with a low value may decay more quickly, while the portions of the heat map corresponding to more important root metadata my decay more slowly. That is, although heat map decay may occur, such decay may be regulated based on the metadata type of the cache entry. For example, root metadata may be hotter because all I/O threads accessing any shard of the object will access the root metadata. A metadata object may be evicted from the cache once the object temperature corresponding thereto, as represented on the heat map, reaches zero.

It should be noted that metadata of low value (e.g., metadata that is assigned a metadata type associated with lower importance) may be treated as though it has high value. An example of low value metadata being treated as though it has high value is a news story that is suddenly frequently accessed. Even when the metadata associated with the news story is associated with a low value, its frequency of access causes the cache manager to treat the metadata as though it has higher value.

For example, by taking the heat map into consideration, if a metadata object is very hot, despite being associated with a low value, the cache manager may decide to keep the metadata in the cache when it would otherwise be evicted. This ensures that as the size of the working set increases, the cache self-tunes to discriminate the more valuable metadata over the less valuable metadata, thereby remaining effective by caching only high value metadata. At the same time the cache stays effective for I/O hotspots because it will cache the less valuable metadata for object shards that are the target of such hotspots.

Accordingly, embodiments of the present disclosure both use the metadata type of the metadata to have a hierarchy of classes of metadata, and also use a heat map to remaining sensitive to local hotspots.

As described above, embodiments of the present disclosure provide a scalable self-tuning mechanism for a metadata cache, provide scalable cache performance that scales with the size of the working set, and stay effective by managing performance for I/O hotspots with increasing size of the working set. Accordingly, embodiments of the present disclosure provide improvements to distributed object store technology by ensuring that I/O path performance does not degrade as a size of working set scales, and by allowing I/O path performance to handle I/O hotspots even with increasing size of working set, thereby resulting in an efficient self-tuning mechanism for the cache.

In the description, for the purposes of explanation, numerous specific details provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A method of cache entry management, the method comprising:
    determining, by a cache manager, a level of importance for each of a plurality of cache entries;
    assigning, by the cache manager, a metadata type for each of the cache entries based upon the determined level of importance;
    determining, by the cache manager, a frequency of access of each of the cache entries;
    generating, by the cache manager, a heat map based upon the determined frequency of access of the cache entries; and
    determining, by the cache manager, which one of at least two of the cache entries to evict based upon the respective metadata types and the respective frequencies of access.

2. The method of claim 1, further comprising causing, by the cache manager, portions of the heat map corresponding to cache entries having a lower level of importance to decay faster than other portions of the heat map corresponding to cache entries having a higher level of importance.

3. The method of claim 1, further comprising evicting, by the cache manager, one of the cache entries once a portion of the heat map corresponding to the one of the cache entries reaches zero.

4. The method of claim 1, further comprising causing, by the cache manager, a portion of a heat map corresponding to a shard of an object to decay faster than a portion of the heat map corresponding to an entirety of the object.

5. The method of claim 1, further comprising walking, by the cache manager, the cache, and evicting, by the cache manager, all of the cache entries corresponding to a level of importance that is less than a reference level of importance.

6. The method of claim 5, further comprising triggering, by the cache manager, the walking of the cache once an amount of cache resources that are used reaches a reference level.

7. The method of claim 1, further comprising assigning, by the cache manager, a highest level of importance to root metadata representing an entirety of an object, and assigning, by the cache manager, a lower level of importance to other metadata related to the object for shard metadata representing a shard of the object.

8. An object store configured to allow cache management while scaling with the size of a working set, the object store comprising a data cache that is configured to be managed by a cache manager, wherein the cache manager is configured to:
    determine a level of importance for each of a plurality of cache entries;
    assign a metadata type for each of the cache entries based upon the determined level of importance;
    determine a frequency of access of each of the cache entries;

generate a heat map based upon the determined frequency of access of the cache entries; and determine which one of at least two of the cache entries to evict based upon the respective metadata types and the respective frequencies of access.

9. The object store of claim 8, wherein the cache manager is further configured to cause portions of the heat map corresponding to cache entries having a lower level of importance to decay faster than other portions of the heat map corresponding to cache entries having a higher level of importance.

10. The object store of claim 8, wherein the cache manager is further configured to evict one of the cache entries once a portion of the heat map corresponding to the one of the cache entries reaches zero.

11. The object store of claim 8, wherein the cache manager is further configured to cause a portion of a heat map corresponding to a shard of an object to decay faster than a portion of the heat map corresponding to an entirety of the object.

12. The object store of claim 8, wherein the cache manager is further configured to walk the data cache, and evict all of the cache entries corresponding to a level of importance that is less than a reference level of importance.

13. The object store of claim 12, wherein the cache manager is further configured to trigger the cache manager to walk the data cache once an amount of cache resources that are used reaches a reference level.

14. The object store of claim 8, wherein the cache manager is further configured to assign a highest level of importance to root metadata representing an entirety of an object, and assign a lower level of importance to other metadata related to the object for shard metadata representing a shard of the object.

15. A non-transitory computer readable medium implemented on a distributed object store system, the non-transitory computer readable medium having computer code that, when executed on a processor, implements a method of cache management by a cache manager of a data cache of the distributed object store system, the method comprising:

determining, by the cache manager, a level of importance for each of a plurality of cache entries;

assigning, by the cache manager, a metadata type for each of the cache entries based upon the determined level of importance;

determining, by the cache manager, a frequency of access of each of the cache entries;

generating, by the cache manager, a heat map based upon the determined frequency of access of the cache entries; and determining, by the cache manager, which one of at least two of the cache entries to evict based upon the respective metadata types and the respective frequencies of access.

16. The non-transitory computer readable medium of claim 15, wherein the computer code, when executed by the processor, further implements the method of cache management of the data cache of the distributed object store system by causing, by the cache manager, portions of the heat map corresponding to cache entries having a lower level of importance to decay faster than other portions of the heat map corresponding to cache entries having a higher level of importance.

17. The non-transitory computer readable medium of claim 15, wherein the computer code, when executed by the processor, further implements the method of cache management of the data cache of the distributed object store system by evicting, by the cache manager, one of the cache entries once a portion of the heat map corresponding to the one of the cache entries reaches zero.

18. The non-transitory computer readable medium of claim 15, wherein the computer code, when executed by the processor, further implements the method of cache management of the data cache of the distributed object store system by causing, by the cache manager, a portion of a heat map corresponding to a shard of an object to decay faster than a portion of the heat map corresponding to an entirety of the object.

19. The non-transitory computer readable medium of claim 15, wherein the computer code, when executed by the processor, further implements the method of cache management of the data cache of the distributed object store system by walking, by the cache manager, the data cache, and evicting, by the cache manager, all of the cache entries corresponding to a level of importance that is less than a reference level of importance.

20. The non-transitory computer readable medium of claim 19, wherein the computer code, when executed by the processor, further implements the method of cache management of the data cache of the distributed object store system by triggering, by the cache manager, walking of the data cache once an amount of cache resources that are used reaches a reference level.

* * * * *